(12) United States Patent
Ooba

(10) Patent No.: US 11,660,757 B2
(45) Date of Patent: May 30, 2023

(54) ROBOT CONTROL SYSTEM SIMULTANEOUSLY PERFORMING WORKPIECE SELECTION AND ROBOT TASK

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 250 days.

(21) Appl. No.: 16/926,780

(22) Filed: Jul. 13, 2020

(65) Prior Publication Data
US 2021/0039261 A1 Feb. 11, 2021

(30) Foreign Application Priority Data

Aug. 5, 2019 (JP) .............................. JP2019-143977

(51) Int. Cl.
| | |
|---|---|
| *B25J 9/00* | (2006.01) |
| *B25J 9/16* | (2006.01) |
| *B25J 13/08* | (2006.01) |
| *B25J 15/06* | (2006.01) |

(52) U.S. Cl.
CPC ........... *B25J 9/1697* (2013.01); *B25J 9/0084* (2013.01); *B25J 9/0093* (2013.01); *B25J 9/1664* (2013.01); *B25J 9/1679* (2013.01); *B25J 13/08* (2013.01); *B25J 15/0616* (2013.01); *B25J 9/003* (2013.01); *G05B 2219/40306* (2013.01); *G05B 2219/50391* (2013.01)

(58) Field of Classification Search
CPC ...... B25J 9/1697; B25J 9/0084; B25J 9/0093; B25J 9/1664; B25J 9/1679; B25J 13/08; B25J 15/0616; B25J 9/003; B25J 9/0051; B25J 19/023; B25J 9/1602; B25J 9/1682; G05B 2219/40306; G05B 2219/50391; G05B 2219/40267; G05B 2219/40604
See application file for complete search history.

(56) References Cited

U.S. PATENT DOCUMENTS

| | | | | |
|---|---|---|---|---|
| 9,457,474 | B1 * | 10/2016 | Lisso | ...................... B26D 1/45 |
| 2006/0276934 | A1 * | 12/2006 | Nihei | ..................... B25J 9/1679 |
| | | | | 700/245 |
| 2008/0009972 | A1 * | 1/2008 | Nihei | ..................... B25J 9/1669 |
| | | | | 700/245 |

(Continued)

FOREIGN PATENT DOCUMENTS

| | | |
|---|---|---|
| JP | 2001-252886 A | 9/2001 |
| JP | 20041122 A | 1/2004 |

(Continued)

*Primary Examiner* — B M M Hannan
(74) *Attorney, Agent, or Firm* — Hauptman Ham, LLP

(57) ABSTRACT

A robot control system includes: a selector configured to perform a selection of a task object from among a plurality of workpieces by using a first vision sensor; and an operation control section configured to control a robot to perform a task on the task object by using a tool. The selection and the task are executed simultaneously and in parallel, the selector transmits the information of the selected task object to the operation control section before the task, and the operation control section controls the robot based on the transmitted information of the task object.

12 Claims, 4 Drawing Sheets

(56) References Cited

U.S. PATENT DOCUMENTS

| | | | | |
|---|---|---|---|---|
| 2009/0216368 A1* | 8/2009 | Thorsson | ............ | G01G 19/303 |
| | | | | 209/552 |
| 2014/0259615 A1* | 9/2014 | Fukuda | ............ | G05B 19/41865 |
| | | | | 29/430 |
| 2014/0360306 A1* | 12/2014 | Mihara | ................ | B25J 19/0029 |
| | | | | 901/27 |
| 2018/0056516 A1* | 3/2018 | Tsukamoto | ............ | B25J 9/0093 |
| 2018/0189111 A1* | 7/2018 | Bequet | ................ | G06N 3/0454 |
| 2018/0361586 A1* | 12/2018 | Tan | .......................... | B61J 99/00 |
| 2019/0000094 A1* | 1/2019 | Hjalmarsson | ............ | B25J 9/107 |
| 2019/0291277 A1* | 9/2019 | Oleynik | ................ | B25J 9/1697 |
| 2020/0288731 A1* | 9/2020 | Hjalmarsson | .......... | A22C 25/18 |

FOREIGN PATENT DOCUMENTS

| | | |
|---|---|---|
| JP | 200887074 A | 4/2008 |
| JP | 201834242 A | 3/2018 |
| JP | 2018-058191 A | 4/2018 |

\* cited by examiner

ROBOT CONTROL SYSTEM SIMULTANEOUSLY PERFORMING WORKPIECE SELECTION AND ROBOT TASK

RELATED APPLICATIONS

The present application claims priority to Japanese Application Number 2019-143977, filed Aug. 5, 2019, the disclosure of which is hereby incorporated by reference herein in its entirety.

BACKGROUND OF THE INVENTION

1. Field of the Invention

The present invention relates to a robot control system, and more particularly to a robot control system that simultaneously performs a workpiece selection and a robot task.

2. Description of the Related Art

When performing a task on a workpiece using an industrial robot, in a case that the workpiece is stationary, the robot may be controlled based on the position and the orientation taught in advance. However, in a case that the workpiece is temporarily stopped or the workpiece continues to move, the relative relationship between the workpiece and the robot changes, thus robot control for correcting the position and the orientation of the robot using a vision sensor is widely performed.

JP 2004-1122 A discloses a picking device which, in a picking operation for a moving workpiece, uses a first stereo camera fixedly installed in the vicinity of the workpiece placement position to determine the position and the orientation of the workpiece, moves a hand to the vicinity of the workpiece position, and uses a second stereo camera installed in the vicinity of the hand to determine a deviation amount of the real position and the real orientation of the workpiece and then determines the final position and orientation of the workpiece.

JP 2008-87074 A discloses a workpiece takeout device, which selects a workpiece to be taken out from among a set of workpieces by recognizing a rough position of the workpiece by using a wide area sensor installed above a storage box, and then precisely measures the three-dimensional position of the workpiece using a narrow-area sensor attached to a robot hand to take out the workpiece, in which a workplace to be measured is selected excluding the workpiece for which the measurement of the three-dimensional position and the takeout has failed and which has thereafter memorized.

JP 2018-34242 A discloses a method which includes, designating a first region for a desired object from among a plurality of objects included in an image captured by a camera fixed to a support, designating a second region for grasping the object by a robot, and causing the robot to grasp the object designated the second region which does not overlap the first region of another object.

SUMMARY OF THE INVENTION

When performing a robot task by selecting a task object from among multiple workpieces, in a case that, after looking out over a whole workpiece group with a vision sensor installed in the vicinity of the tool, the task object is narrowed down and the task is performed, then the cycle time increases because the workpiece selection and the robot task are processed in serial. Also, when the workpiece is moving around, the workpiece will be turned over or obstructed by other workpiece, and it will not be possible to detect the presence or absence of a flaw on the workpiece, or the presence or absence of a label, or the like, and therefore the workpiece selection is time consuming, and robot task on the workpiece is delayed. Further, when the workpieces are in contact with each other or overlap each other, it takes time to detect the workpieces by pattern matching, and the robot task may be delayed. In such a system configuration, the workpiece cannot be selected unless the workpiece is monitored for a certain period of time, and thus the cycle time is further increased.

Therefore, there is a need for a technique for reducing the cycle time when performing a robot task by selecting a task object from among a plurality of workpieces.

One aspect of the present disclosure provides a robot control system, which includes: a robot; a tool attached to an end of the robot; a first vision sensor installed at a fixed position separate from the robot; a selector configured to perform a selection of a task object from among a plurality of workpieces by using the first vision sensor; and an operation control section configured to control the robot to perform a task on the task object by using the tool. The selection and the task are executed simultaneously and in parallel, the selector transmits the information of the selected task object to the operation control section before the task, and the operation control section controls the robot based on the transmitted information of the task object.

DETAILED DESCRIPTION

Embodiments of the present disclosure will be described in detail below with reference to the accompanying drawings. In each drawing, the same or similar components are denoted by the same or similar numerals. Additionally, the embodiments described below are not intended to limit the technical scope of the invention or the meaning of terms set forth in the claims.

Figure 1:
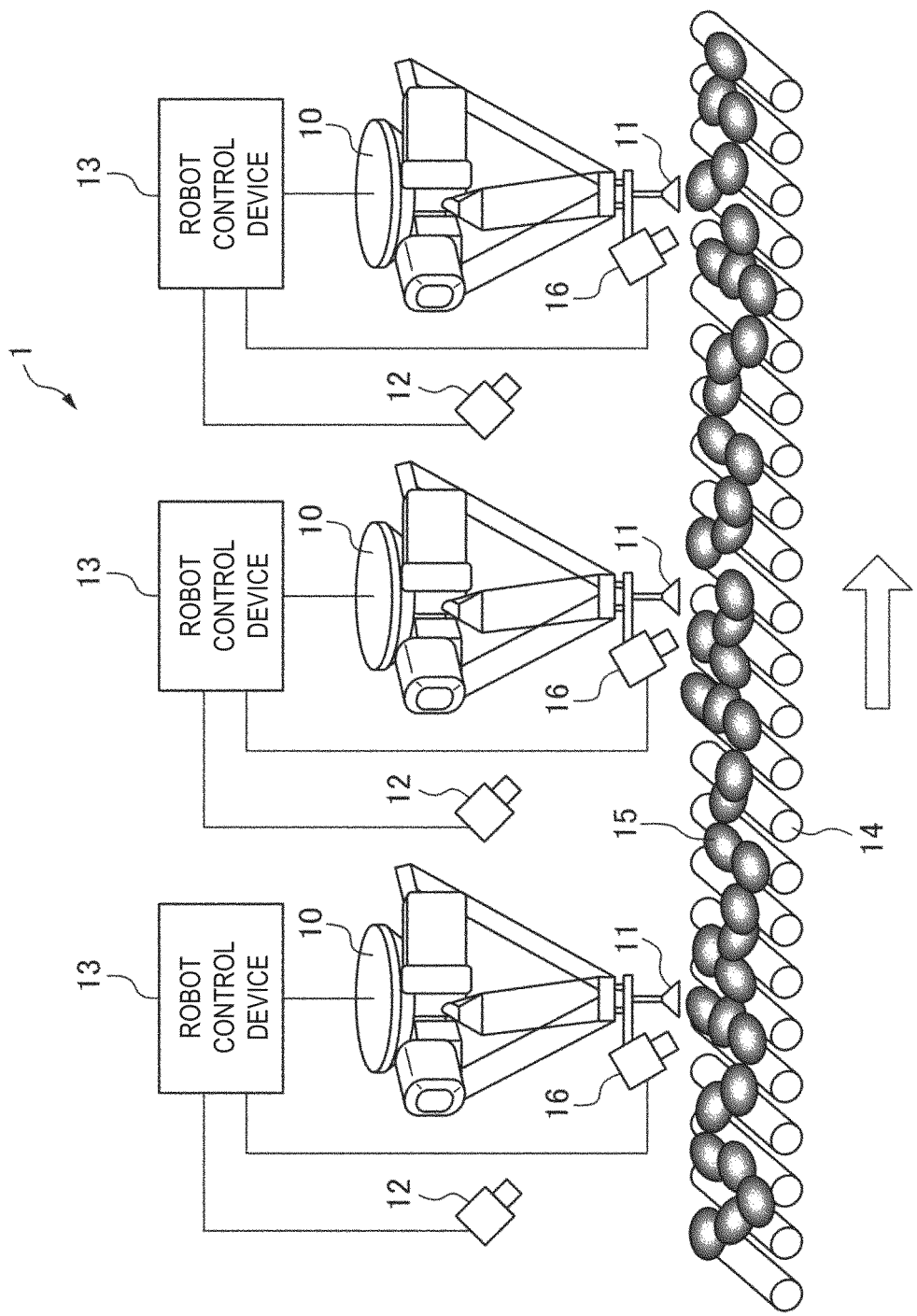
FIG. 1 is a perspective view illustrating a schematic configuration of a robot control system according to an embodiment.

FIG. 1 illustrates a schematic configuration of a robot control system 1 according to the present embodiment. The robot control system 1 includes a robot 10, a tool 11 attached to an end of the robot 10, a first vision sensor 12 installed in a fixed position separate from the robot 10, and a robot control device 13 configured to control the robot 10. The robot 10 is a parallel link type robot, and it may be another industrial robot such as an articulated robot. The tool 11 is a suction type hand capable of gripping the workpiece 15, and other tools may be used depending on the task contents of the robot 10. For example, the tool 11 may be a hand with a plurality of claws, or other processing tools such as a labeling tool, a screw fastening tool, a welding tool, a soldering tool, and a cutting tool. The first vision sensor 12 may be a two-dimensional sensor such as a charge-coupled device (CCD) camera, or a three-dimensional sensor such as a time-of-flight (TOF) camera, a laser scanner, and a stereo camera.

The workpiece 15 is a vegetable, fruit, or the like for which a good product or a defective product is selected depending on the presence or absence of a flaw. However, other articles requiring selection such as an unworked product or a worked product, a specified product or a non-specified product may be used. For example, the workpiece 15 may be a labeled product selected as being labeled or unlabeled depending on whether or not there is a label, a screw-fastened product selected as being fastened or not fastened depending on whether or not a screw is fastened, a welded product selected as being of high or low quality in welding, or a cut product selected as requiring or not requiring cutting depending on necessity of a cutting process.

A robot control system 1 selects a task object (referred to as "workpiece selection") from among a plurality of workpieces 15 by using the first vision sensor 12 and controls the robot 10 to perform a task (referred to as "robot task") on the task object. The robot task is a takeout of a task object using the tool 11, but other tasks such as labeling, screw fastening, welding, soldering, and cutting may be performed.

Although the workpiece 15 continues to move while being transported by a transport device 14, the transport device 14 may pause to stop the workpiece 15 during the robot task. Alternatively, the workpiece 15 may be fixed by a fixing device (not illustrated) and remain stationary. The transport device 14 is a conveyor for transporting the workpiece 15, but may be any other transport device such as an automatic guided vehicle (AGV). The transport device 14 is a roller conveyor for vibrating the workpiece 15 so as to monitor a portion of the workpiece that are not visible to the first vision sensor 12. However, other vibration generating devices may be used for the transport device 14. This allows the workpiece 15 to be in contact with each other, overlapping each other, or moving about, but also to monitor a portion of the workpiece that are not visible to the first vision sensor 12.

In order to perform a workpiece selection, the first vision sensor 12 is installed at a position where a workpiece group can be overlooked. The first vision sensor 12 is preferably a wide area sensor configured to detect a wide area to overlook a workpiece group. When the workpiece 15 is kept stationary, only the first vision sensor 12 can be used for a workpiece selection and a robot task. However, when the workpiece 15 pauses or the workpiece 15 continues to move, the position and the orientation of the workpiece are changed, thus a second vision sensor 16 may be further installed in the vicinity of the tool 11. By detecting the task object with high accuracy by using the second vision sensor 16, the robot 10 can follow the task object. The second vision sensor 16 is preferably a narrow area sensor configured to detect an area narrower than the wide area sensor.

The robot control system 1 can set the origin of a robot coordinate system to the base of the robot 10 and can set the origin of a tool coordinate system to the vicinity of the tool 11. At this time, the position of the robot 10 is expressed as the origin of the tool coordinate system, and the orientation of the robot 10 is expressed as the orientation of the tool coordinate system with respect to the robot coordinate system. Further, the robot control system 1 can set the origin of a vision sensor coordinate system to an arbitrary point among data acquired respectively by the first vision sensor 12 and by the second vision sensor 16. The robot control system 1 is configured such that arbitrary points in these orthogonal coordinate systems can be mutually transformed in coordinates.

Figure 2:
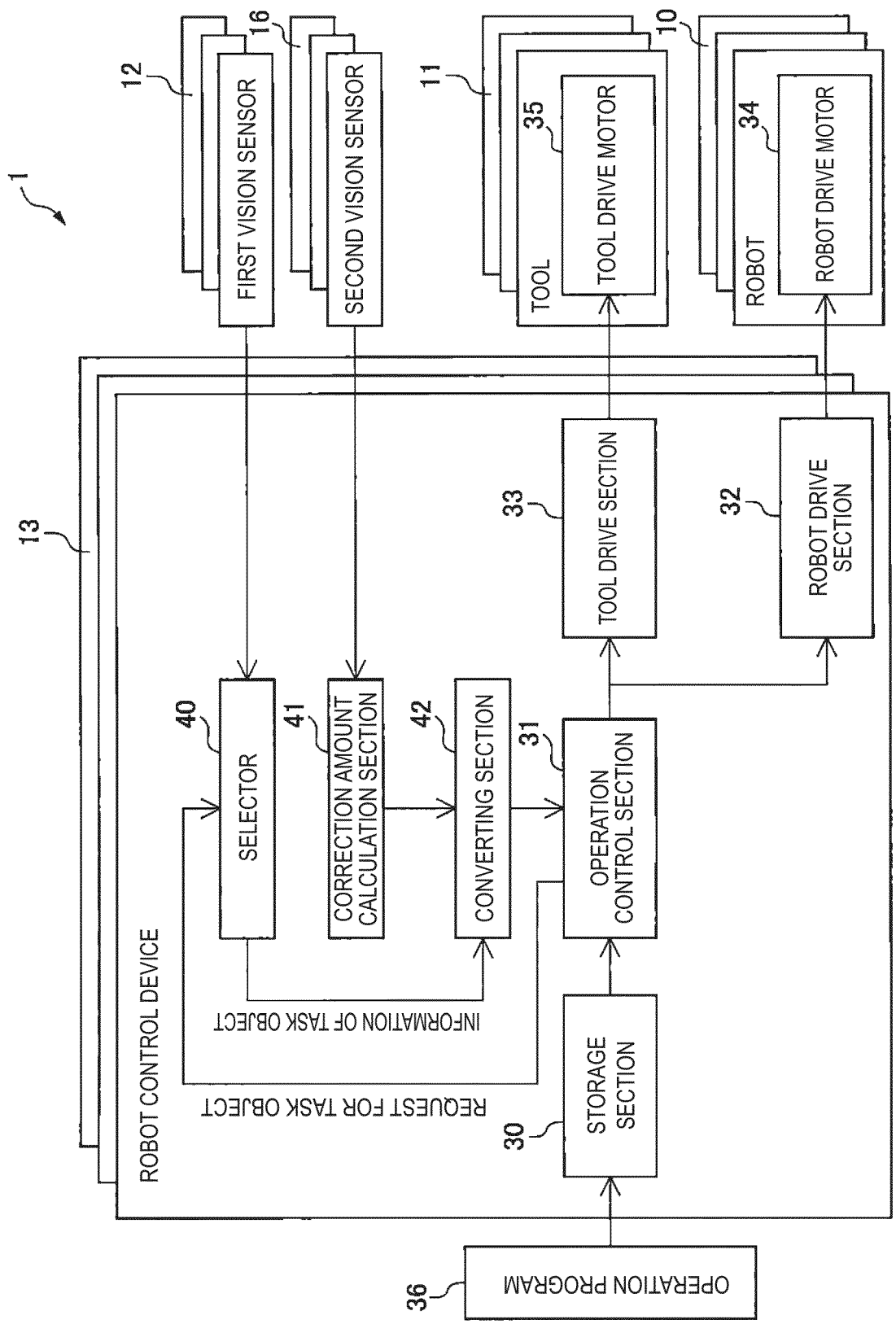
FIG. 2 is a block diagram of a robot control system according to an embodiment.

FIG. 2 illustrates a configuration of the robot control system according to the present embodiment. The robot control device 13 is a control device provided with a processor such as a central processing unit (CPU) and controls the robot 10 by an operation program 36 taught in advance. The robot control device 13 may further control the tool 11 depending on the type of the tool 11. The robot control device 13 includes a storage section 30 configured to store the operation program 36 or the like, an operation control section 31 configured to control the operation of the robot 10 based on the operation program 36, and a robot drive section 32 configured to drive a robot drive motor 34. The robot control device 13 may include a tool drive section 33 configured to drive the tool drive motor 35 depending on the type of the tool 11. The operation program 36 is a program describing a basic operation command for the robot 10 performing a task, and the operation control section 31 transmits the operation command to the robot, drive section 32 or the tool drive section 33 based on the operation program 36. The robot drive section 32 or the tool drive section 33 supplies electricity to the robot drive motor 34 or the tool drive motor 35 based on the operation command.

The robot control device 13 includes a selector 40 configured to select a task object from among a plurality of workpieces by using the first vision sensor 12. The selector 40 transmits the information of the selected task object to the operation control section 31 before the task, and the operation control section 31 controls the robot 10 or the tool 11 based on the transmitted information of the task object. Thus, the robot task is performed. Note, however, that the selector 40 continues the workpiece selection process even during the robot task. That is, the workpiece selection and the robot task are simultaneously and in parallel executed, and transmitting the information of the selected task object before the robot task enables the cycle time to be reduced.

The operation control section 31 requests the selector 40 for the task object before the task, and the selector 40 transmits the information of the task object to the operation control section 31 in response to the request. However, the request may not be issued. For example, a shared memory may be provided between the selector 40 and the operation control section 31, and the selector 40 may continue to transmit the information of the task object to the operation control section 31 via the shared memory. In this case, the selector 40 and the operation control section 31 access the shared memory under exclusive control, such as inter-process communication and inter-thread communication. The information of the task object includes data such as the position and the orientation of the task object. However, it may include only a pointer indicating a storage position in the shared memory.

Preferably, the robot control device 13 may include a correction amount calculation section 41 configured to calculate a deviation amount of the task object by using the second vision sensor 16 so as to be able to follow the task object when the workpiece pauses or continues to move. When the operation control section 31 performs visual feedback control using the deviation amount, the deviation amount, for example, becomes a difference between the current position and the target position of the task object in the position-based method, and becomes a difference between the current feature amount and the target feature amount of the task object in the feature-based method. In the feature-based method, the difference between the feature amount of the task tool and the feature amount of the task object may be used. In this case, the operation control section 31 generates an operation command based on the deviation amount.

When the workpiece continues to move, the correction amount calculation section 41 may calculate a movement prediction amount of the task object from various past data in addition to the deviation amount. The past data may be the past data calculated using the first vision sensor 12 (e.g., the movement speed of the workpiece, or the like), or the past data calculated using the position detection sensor (e.g., the movement speed of the transport device, or the like) when the transport device is provided with the position detection sensor. The position detection sensor includes, for example, a rotary encoder, a laser displacement sensor, or the like. Further, the correction amount calculation section 41 may generate a learning model by performing machine learning, that is, supervised learning based on the past data, and calculate the movement prediction amount of the task object based on the generated learning model. In addition to the visual feedback control using the deviation amount, the operation control section 31 may perform feedforward control using the movement prediction amount. Thus, the robot 10 can follow the task object.

Preferably, the robot control device 13 further includes a converting section 42 configured to convert data between the vision sensor coordinate system and the robot coordinate system. The converting section 42 is disposed between the selector 40 and the operation control section 31 and converts the position and orientation of the task object from the vision sensor coordinate system to the robot coordinate system. Alternatively, the converting section 42 is disposed between the correction amount calculation section 41 and the operation control section 31 and converts the deviation amount, the movement prediction amount, or the like, from the vision sensor coordinate system to the robot coordinate system. Alternatively, the converting section 42 may be disposed between the first vision sensor 12 and the selector 40 and between the second vision sensor 16 and the correction amount calculation section 41. In this case, after converting the data acquired by the first vision sensor 12 and the second vision sensor 16 into the robot coordinate system, the position and the orientation of the task object, the deviation amount, the movement prediction amount, or the like are calculated in the robot coordinate system.

Figure 3:
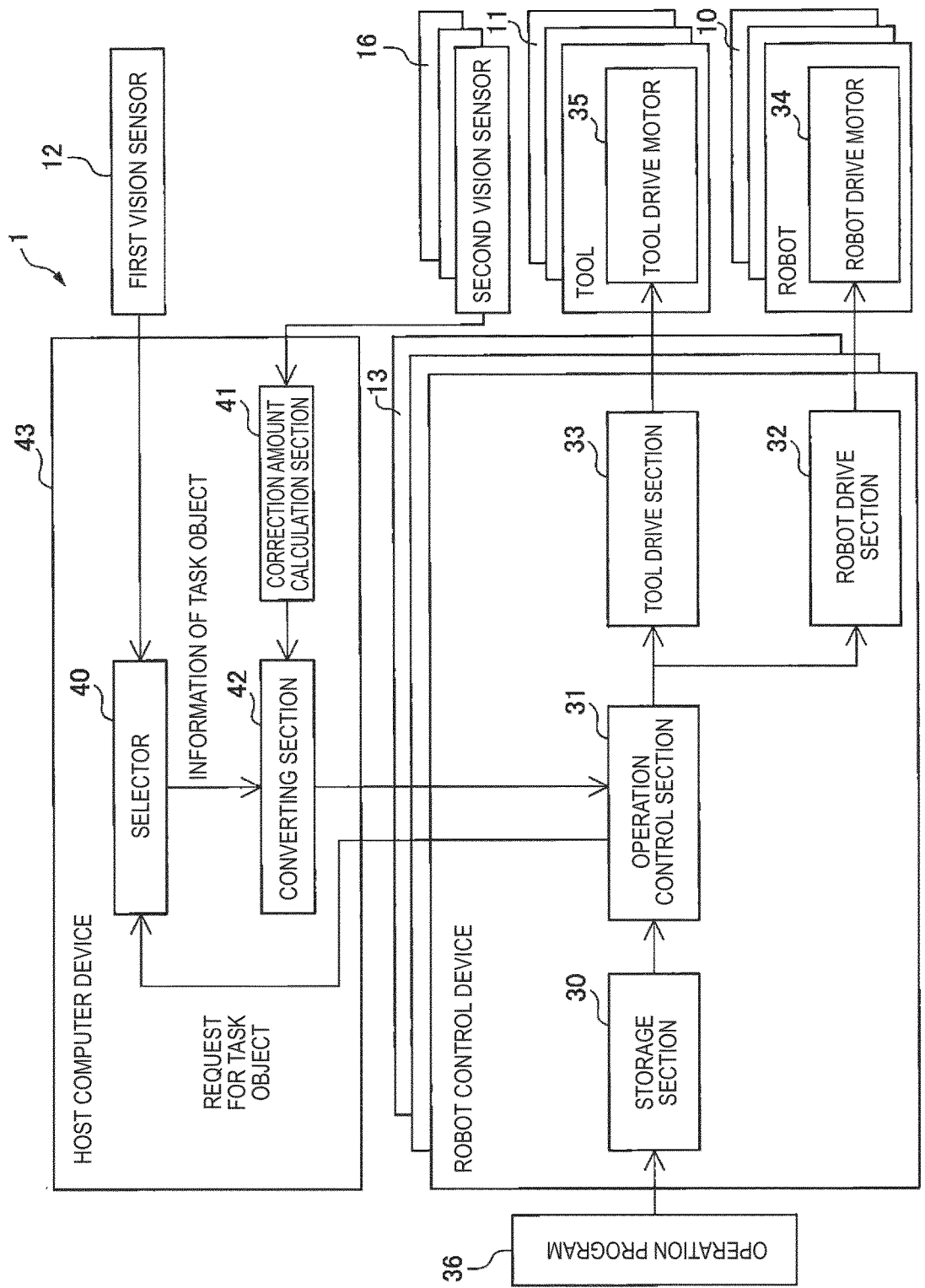
FIG. 3 is a block diagram illustrating a modified example of a robot control system.

FIG. 3 illustrates a modified example of the robot control system 1. The above-described robot control system 1 adopts a stand-alone system configuration, and the robot control device 13 executes a workpiece selection and a robot task simultaneously and in parallel in one device. In the modified example illustrated in FIG. 3, the robot control system 1 adopts a server system configuration and includes a host computer device 43 connected to a plurality of robot control devices 13 in a many-to-one manner. The host computer device 43 includes the selector 40 configured to perform a workpiece selection by using a first vision sensor 12, and transmits information of the selected task object to each of the robot control devices 13 before a task. Further, although a plurality of the above-described first vision sensors 12 are provided in accordance with the number of robots 10, only one first vision sensor 12 may be provided as illustrated in FIG. 3 to view a whole workpiece group.

Moreover, the host computer device 43 may include the correction amount calculation section 41 configured to calculate the deviation amount of each task object by using a plurality of second vision sensors 16 provided in the vicinity of the tools 11 of the plurality of robots 10. In this case, the host computer device 43 transmits the calculated deviation amount to each of the robot control devices 13. Further, the correction amount calculation section 41 may calculate the movement prediction amount of each task object based on the above-described past data and transmit the calculated movement prediction amount to each of the robot control devices 13.

The host computer device 43 may include the converting section 42 configured to convert data between the vision sensor coordinate system and the robot coordinate system. Thus, the host computer device 43 can convert the data acquired by the first vision sensor 12 or the second vision sensor 16, the data calculated from these data or the like into the robot coordinate system at a high speed and can transmit them to a desired robot control device 13 at a high speed.

Figure 4:
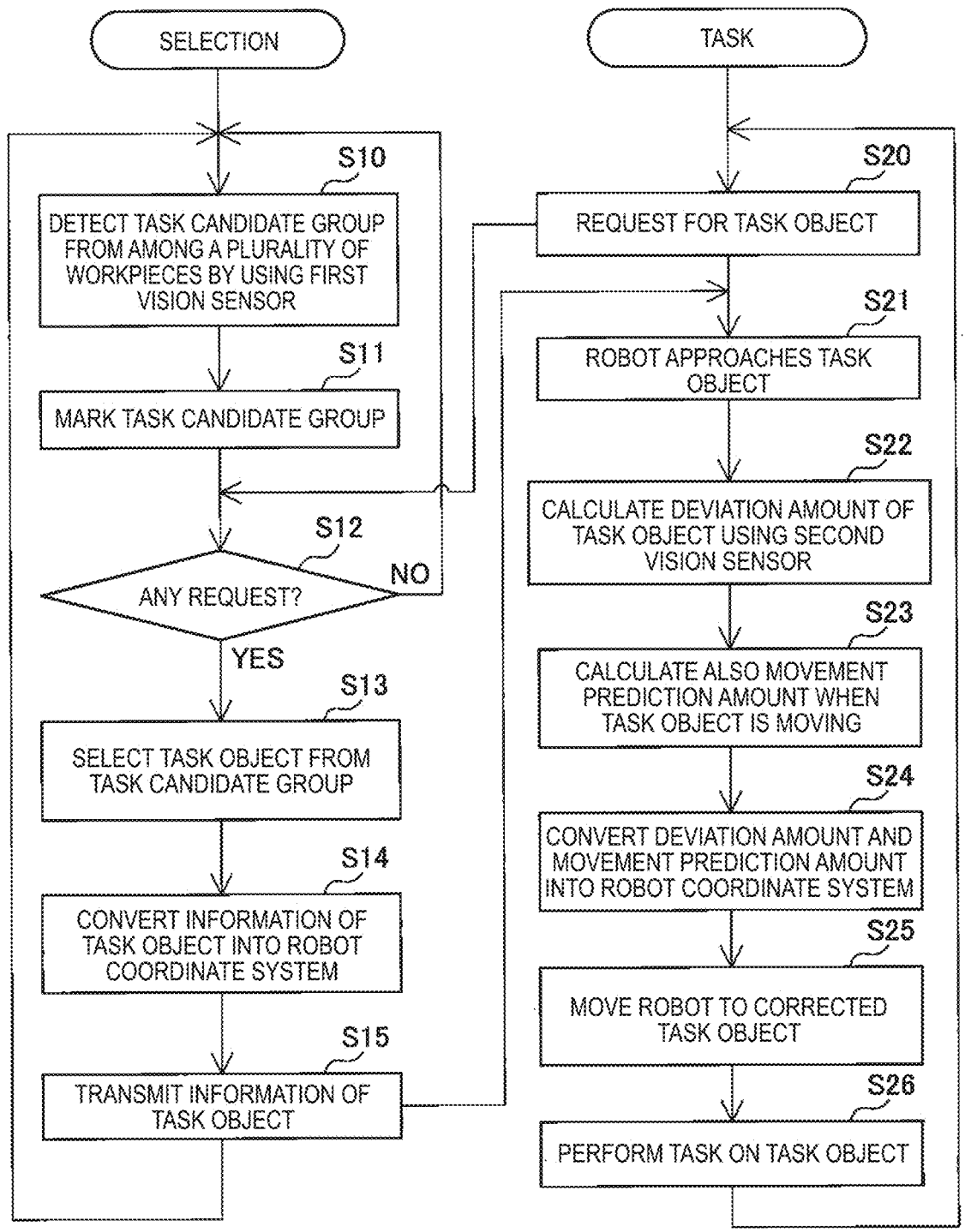
FIG. 4 is a schematic flow chart illustrating an operation of a robot control system according to an embodiment.

FIG. 4 illustrates the operation of the robot control system 1 according to the present embodiment. It should be noted that a workpiece selection and a robot task are performed simultaneously and in parallel. In the workpiece selection, first, in step S10, a task candidate group for a task object is detected from among a plurality of workpieces by using the first vision sensor. The task candidate group can be detected by various methods, and may be detected as described below, for example. Workpieces are detected from data acquired by the first vision sensor by pattern matching, a desired workpiece (e.g., a workpiece with a flaw or the like) is further detected from among the detected workplaces by blob, and a workpiece group for which the detection has succeeded is made to be a task candidate group. In step S11, the detected task candidate group is marked. In step S12, it is determined whether there is a request for a task object from the operation control section. When there is no request for the task object (NO in step S12), the process returns to step S10, and the detection and the marking for the task candidate group are repeated. The task candidate once marked is not excluded from the task candidate group even when the workpiece cannot be detected as a desired workpiece (e.g., a workpiece with a flaw or the like) because the workpiece is reversed or blocked by another workpiece.

When there is a request for the task object (YES in step S12), the process proceeds to step S13, where a task object is selected from the task candidate group. The task object can be selected by various methods, and may be selected as described below, for example. When the workpiece is transported, for example, a task candidate positioned at the head in the travel direction of the workpiece is selected as a task object. When the workpiece is kept stationary, for example, a task candidate closest to the tool is selected as a task object. In step S14, the information of the task object (e.g., the position, the orientation or the like of the task object) is converted into the robot coordinate system. However the data acquired by the first vision sensor in step S10 may be first converted into the robot coordinate system. In step S15, the information of the task object is transmitted from the selector to the operation control section.

On the other hand, in the robot task, first, in step S20, the operation control section requests the selector for the task object. In step S21, the robot approaches the task object based on the information of the task object. When the second vision sensor is provided, at least a portion of the task object is included in the imaging range of the second vision sensor. In step S22, the deviation amount of the task object is calculated using the second vision sensor. When the task object continues to move, the movement prediction amount of the task object may be calculated in step S23. In step S24, the deviation amount, the movement prediction amount, or the like are converted into the robot coordinate system.

However, data acquired by the second vision sensor in step S22 may be first converted into a robot coordinate system in advance. In step S25, the robot is moved to the corrected task object. In step S26, the robot performs a task (e.g., takeout of a task object) on the task object by using the tool. When the task is completed, the process returns to step S20, and the operation control section requests the selector for a next task object before the task. Since the selector continues the process of selecting the workpiece illustrated in steps S10 and S11 even during the task by the robot from step S21 to step S26, the workpiece selection and the robot task are executed simultaneously and in parallel.

As described above, the operation control section does not have to issue the request for a task object to the selector. In this case, the selector continues to transmit the information of the task object to the operation control section via the shared memory. Therefore, steps S20 and S12 relating to the request for the task object are not required. Further, the information of the task object may be the information of the task candidate group for which the priority is set, rather than the information of the selected task object.

In addition, it should be noted that when the workpiece remains stationary for a long time, the second vision sensor is not required, and thus the processing for following the task object from step S22 to S25 becomes unnecessary.

According to the embodiment described above, since the workpiece selection and the robot task are simultaneously and in parallel executed and the information of the selected task object is transmitted before the task, the cycle time can be reduced.

The program for executing the above-described flow chart may be recorded in a computer readable non-transitory recording medium such as a CD-ROM.

While various embodiments have been described herein, it should be appreciated that the present invention is not limited to the above-described embodiments, and various modifications may be made thereto within the scope of the following claims.

The invention claimed is:

1. A robot control system, comprising:
a robot;
a tool attached to an end of the robot;
a first vision sensor installed at a fixed position separate from the robot; and
a robot control device including
a non-transitory computer readable medium storing a robot operation program, and
a processor configured to execute the robot operation program to:
perform a selection of a first task object from among a plurality of workpieces by using the first vision sensor; and
control the robot to perform a task on the selected first task object by using the tool,
wherein the processor is further configured to execute the robot operation program to:
perform a selection of a second task object from among the plurality of workpieces while the robot performs the task on the selected first task object,
transmit information of the selected second task object before the robot performs a task on the second task object, and
control the robot to perform the task on the selected second task object based on the transmitted information of the selected second task object.

2. The robot control system of claim 1, wherein
the processor is further configured to execute the robot operation program to:
request the selection of the first task object before the task on the selected first task object is performed by the robot, and
transmit information of the selected first task object in response to the request.

3. The robot control system of claim 1, wherein
the processor is further configured to execute the robot operation program to continue a process of the selection of the second task object during the task on the first task object performed by the robot.

4. The robot control system of claim 1, further comprising:
a second vision sensor installed in a vicinity of the tool, wherein the processor is further configured to execute the robot operation program to calculate a deviation amount of the selected first task object or the selected second task object by using the second vision sensor.

5. The robot control system of claim 4, wherein
the processor is further configured to execute the robot operation program to, in response to the plurality of workpieces moving, calculate a movement prediction amount of the selected first task object or the selected second task object.

6. The robot control system of claim 5, wherein
the processor is further configured to execute the robot operation program to,
in response to the plurality of workpieces being paused from moving, perform correction by using the deviation amount, and
in response to the plurality of workpieces continuing to move, perform feedforward control by using the movement prediction amount in addition to visual feedback control by using the deviation amount.

7. The robot control system of claim 4, wherein
the first vision sensor is a wide area sensor configured to detect a wide area to overlook the plurality of workpieces, and
the second vision sensor is a narrow area sensor configured to detect a narrower area than the wide area sensor.

8. The robot control system of claim 4, wherein
the processor is further configured to execute the robot operation program to convert data between (i) a coordinate system of the first vision sensor or the second vision sensor and (ii) a coordinate system of the robot.

9. The robot control system of claim 1, comprising:
a host computer device; and
the robot control device including a plurality of processors configured to execute the robot operation program, wherein
the host computer device
is connected to the plurality of processors,
is configured to select a third task object from among the plurality of workpieces by using the first vision sensor, and
is configured to transmit information of the selected third task object to each of the plurality of processors before the robot performs a task on the selected third task object.

10. The robot control system of claim 1, wherein
a plurality of or one of first vision sensors including the first vision sensor is installed in accordance with a number of robots including the robot.

11. The robot control system of claim 1, wherein
the workpieces are in contact with each other, or overlapping each other, or moving around each other.

12. The robot control system of claim 11, further comprising:
a transport device configured to transport the plurality of workpieces,
wherein
the transport device is configured to
temporarily stop transporting the plurality of workpieces during the task on the selected first task object or the task on the selected second task object, or
continue to transport the plurality of workpieces during the task on the selected first task object or the task on the selected second task object.

* * * * *